United States Patent [19]
Chang

[11] Patent Number: 5,853,138
[45] Date of Patent: Dec. 29, 1998

[54] PLASTIC FILM PROCESSING APPARATUS

[76] Inventor: Chi-Ping Chang, No. 13, Lane 82, Ren Ai St., Sanchung, Taipei Hsien, Taiwan

[21] Appl. No.: 768,070

[22] Filed: Dec. 16, 1996

[51] Int. Cl.$^6$ .................................................. B65H 35/00
[52] U.S. Cl. .................................... 242/525.4; 242/526.1
[58] Field of Search .............................. 242/525.4, 526.1, 242/538.2

[56] References Cited

U.S. PATENT DOCUMENTS

| | | | |
|---|---|---|---|
| 1,967,202 | 7/1934 | Dalton | 242/525.4 |
| 2,328,109 | 8/1943 | Thompson | 242/526.1 |
| 3,140,838 | 7/1964 | Hulett | 242/525.4 |
| 4,507,535 | 3/1985 | Bennett et al. | 242/526.1 |

*Primary Examiner*—John P. Darling
*Attorney, Agent, or Firm*—Rosenberg, Klein & Bilker

[57] ABSTRACT

A plastic film processing apparatus adapted for processing tiny pores in a plastic film, enabling it to be torn in any direction, the apparatus including two lifting blocks vertically adjusted by a respective adjusting screw, an impression cylinder revolvably mounted between the lifting blocks by bearings, a film transfer cylinder having fine grains raised from the periphery and peripherally disposed in contact with the impression cylinder for processing tiny pores in the plastic film passing through.

6 Claims, 4 Drawing Sheets

PLASTIC FILM PROCESSING APPARATUS

BACKGROUND OF THE INVENTION

The present invention relates to plastic film processing apparatus, and more particularly to a plastic film processing apparatus adapted for processing plastic films, permitting processed plastic films to be torn easily in any direction.

Regular plastic films are commonly tear-proof. By use of special surface processing techniques, however, plastic film may be fabricated such that it may be readily torn process. For example, a cutter-free adhesive tape can be easily torn at the desired length. The film material for making a cutter-free adhesive tape, is embossed before the application of glue. When a plastic film is embossed, it can be torn easily by hand. However, an embossed plastic film can only be torn in a particular direction, for example in the transverse direction, therefore its application is limited.

SUMMARY OF THE INVENTION

It is the main object of the present invention to provide a plastic film processing apparatus which permits processed plastic films to be torn in any desired direction. According to one aspect of the present invention, the plastic film processing apparatus comprises two lifting blocks vertically adjusted by a respective adjusting screw, an impression cylinder revolvably mounted between the lifting blocks by bearings, a film transfer cylinder having fine grains raised from the periphery and peripherally disposed in contact with the impression cylinder for processing tiny pores in the plastic film passing through the gap between the impression cylinder and the film transfer cylinder. According to another aspect of the present invention, eccentric wheels are provided and turned by a respective handle to adjust the pitch between the impression cylinder and the film transfer cylinder.

DETAILED DESCRIPTION OF THE PREFERRED EMBODIMENT

Figure 1:
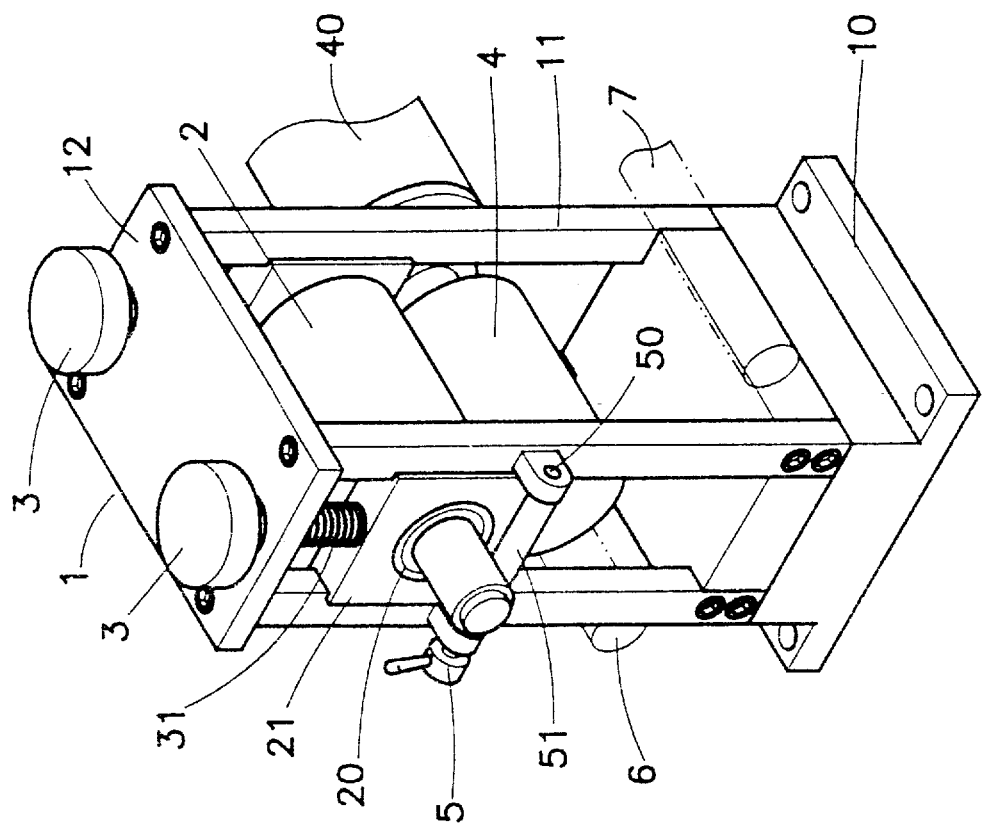
FIG. 1 is an elevational view of a plastic film processing apparatus according to the present invention.
Figure 2:
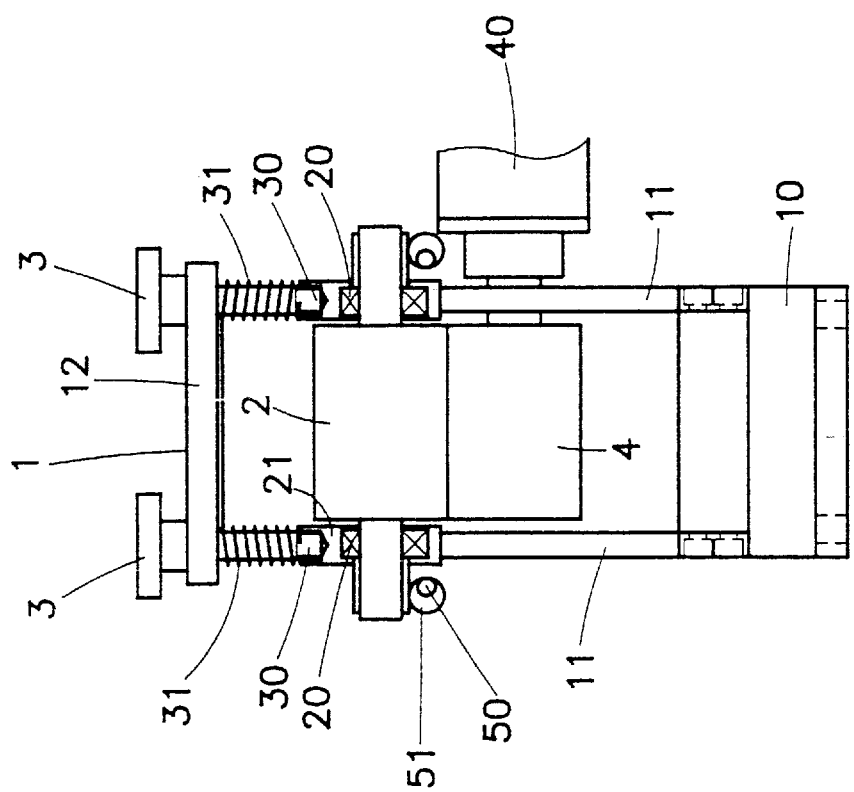
FIG. 2 is a front view of the plastic film processing apparatus shown in FIG. 1.
Figure 3:
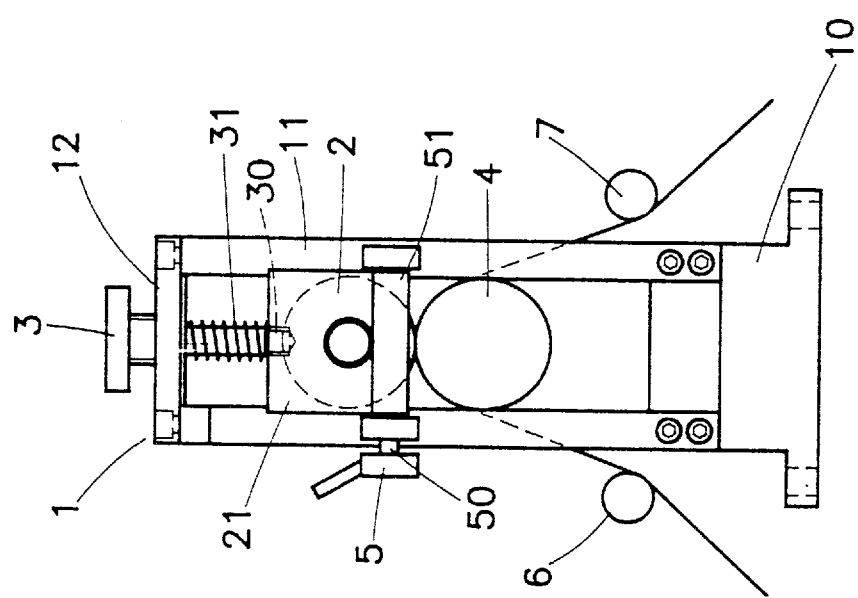
FIG. 3 is a side view of the plastic film processing apparatus shown in FIG. 1.

Referring to FIGS. 1, 2, and 3, a plastic film processing apparatus in accordance with the present invention is generally comprised of a machine base 1, an impression cylinder 2, two pressure adjusting screws 3, and a film transfer cylinder 4.

The machine base 1 can be firmly supported on the ground or a machine table, comprised of a bottom plate 10, a top plate 12, and two symmetrical pairs of upright posts 11 connected between the bottom plate 10 and the top plate 12. The impression cylinder 2 is a smooth cylindrical roll having two round pins 22 raised from two opposite ends and respectively supported on two bearings 20 in two lifting blocks 21. The lifting blocks 21 are bilaterally moved along the upright posts 11. The pressure adjusting screws 3 are respectively mounted in a respective hole (not shown) in the top plate 12. Each pressure adjusting screw 3 has a screw body 30 threaded into a screw hole (not shown) in one lifting block 21. Two springs 31 are respectively mounted around the screw bodies 30 of the pressure adjusting screws 3, and retained between the top plate 12 of the machine base 1 and the lifting blocks 21 to impart a downward pressure to the lifting blocks 21. By turning the pressure adjusting screws 3, the lifting blocks 21 are moved vertically along the upright posts 11, and therefore the elevation of the impression cylinder 2 is adjusted relative to the film transfer cylinder 4. The film transfer cylinder 4 is a rigid cylindrical wheel, for example, a diamond wheel coupled to a transmission shaft 40, having fine grains raised from the periphery. When the film transfer cylinder 4 is installed, it is peripherally disposed in contact with the impression cylinder 2. Further, two transverse axles 50 are horizontally mounted the upright posts 11 at two opposite sides. Two eccentric wheels 51 are respectively and fixedly mounted around the transverse axles 50 and disposed in contact with the periphery of the round pins 22 of the impression cylinder 2. Two handles 5 are respectively fixed to the transverse axles 50 at one end for turning by hand. Through the handles 5, the eccentric wheels 51 can be turned by hand relative to the round pins 22 of the impression cylinder 2, causing the impression cylinder 2 to be lifted from the film transfer cylinder 4 to impart a gap for permitting the plastic film to be processed to pass. When the plastic film is inserted through the gap between the impression cylinder 2 and the film transfer cylinder 4, the handles 5 are turned in the reversed direction to reverse the eccentric wheels 51, and therefore the impression cylinder 2 is lowered and peripherally pressed on the plastic film against the periphery of the film transfer cylinder 4. Guide rollers 6, 7 may be mounted on the machine base 1 at two opposite sides for guiding the plastic film.

Figure 4:
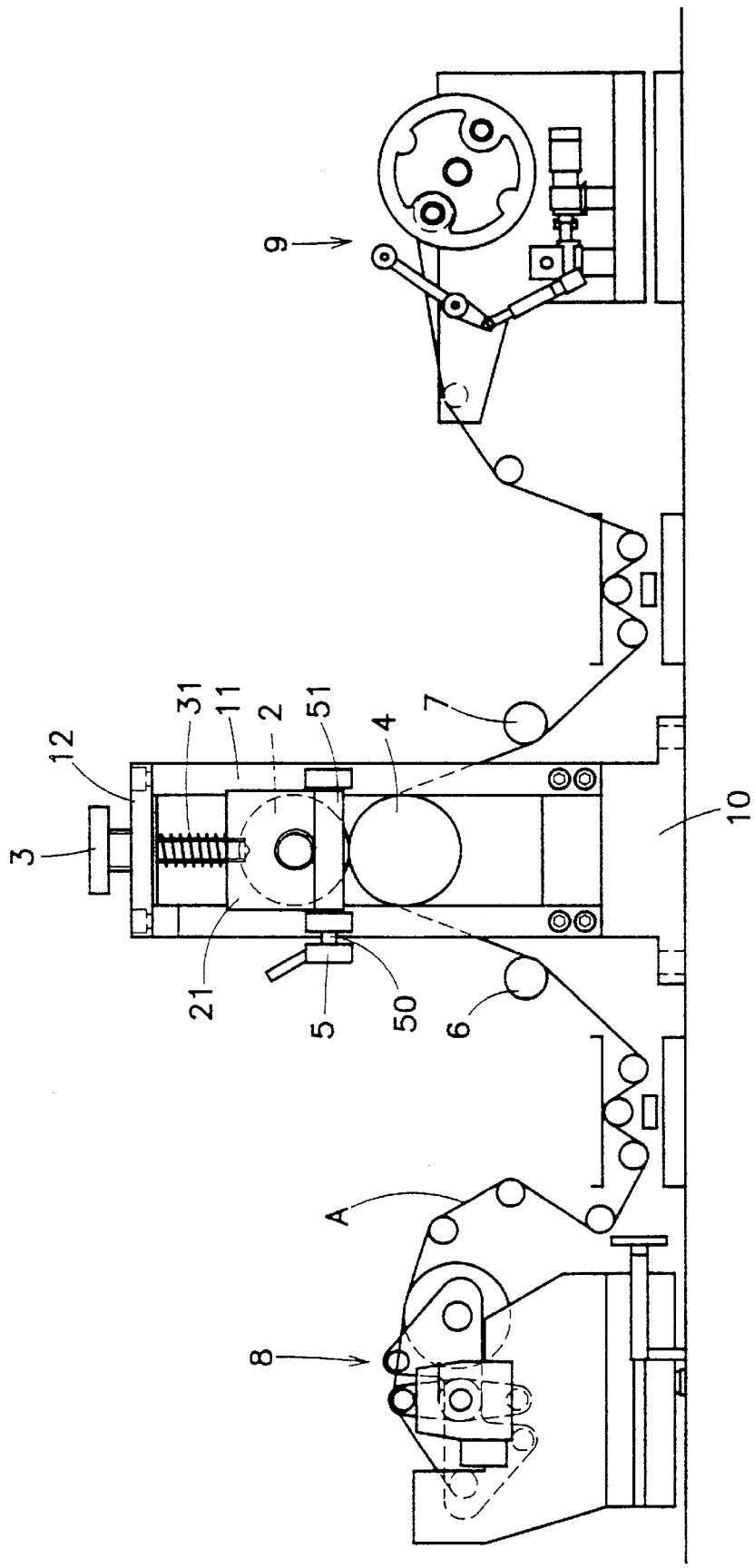
FIG. 4 is an applied view of the present invention, showing the plastic film processing apparatus operated.

Referring to FIG. 4, the plastic film processing apparatus is installed in a machine table between a plastic film let-off mechanism 8 and a plastic film take-up mechanism 9. The lead end of the plastic film A is pulled out of the plastic film let-off mechanism 8, then inserted through the guide rollers 6, 7, and the gap between the impression cylinder 2 and the film transfer cylinder 4, and then connected to the plastic film take-up mechanism 9. When installed, the pressure adjusting screws 3 are turned to adjust the pressure between the impression cylinder 2 and the film transfer cylinder 4. When the plastic film take-up mechanism 9 is turned on to take up the plastic film A, the transmission shaft 40 is synchronously driven to turn the film transfer cylinder 4 (see also FIG. 2), therefore the plastic film A is smoothly taken up by the plastic film take-up mechanism 9. When the plastic film A passes through the gap between the impression cylinder 2 and the film transfer cylinder 4, it is perforated by the fine grains of the film transfer cylinder 4. Therefore, the processed plastic film A has tiny pores evenly distributed over the whole area, and can be torn by hand in any direction.

A plastic film processed through the plastic film processing apparatus, can then be used for making a cutter-free adhesive tape.

While only one embodiment of the present invention has been shown and described, it will be understood that various modifications and changes could be made thereunto without departing from the spirit and scope of the invention disclosed.

What the invention claimed is:

1. An article processing apparatus for forming a plurality of perforations in a plastic article processed thereby comprising:

(a) a machine base assembly;

(b) a pair of substantially opposed lifting blocks coupled to said machine base assembly to be longitudinally displaceable relative thereto, each said lifting block having a central axle bearing portion;

(c) an impression cylinder coupled to said axle said lifting blocks to extend axially therebetween, said impression cylinder having a pair of axially extended round pin portions on opposing ends thereof, said round pin portions respectively engaging said axle bearing portions of said lifting blocks, said impression cylinder having a substantially smooth sidewall portion;

(d) a pair of adjusting screw means coupled to said machine base assembly and threadedly engaging said lifting blocks, respectively, for the longitudinal displacement thereof relative to said machine base assembly; and, (e) a transfer cylinder rotatably coupled to said machine base assembly, said transfer cylinder being disposed substantially adjacent said impression cylinder, said transfer cylinder including a perforating sidewall portion having formed thereon a plurality of grain projections adapted to perforate said plastic article upon engagement thereof against said sidewall portion of said impression cylinder.

2. The article processing apparatus as recited in claim 1 wherein said transfer cylinder includes a diamond wheel.

3. The article processing apparatus as recited in claim 1 further comprising a pair of spring members respectively coupled to said adjusting screw means for biasing said lifting blocks in a downward direction.

4. The article processing apparatus as recited in claim 1 further comprising a pair of eccentric wheel members respectively engaging said round pin portions of said impression cylinder, each said eccentric wheel member being extended along a wheel axis transverse to the axis of said impression cylinder pin portion engaged thereby, each said eccentric wheel member having a handle portion for rotating said eccentric wheel about said wheel axis.

5. The article processing apparatus as recited in claim 1 further comprising a plurality of guide rollers rotatably coupled to said machine base assembly for guiding said plastic article between said impression cylinder and said transfer cylinder for engagement therewith.

6. The article processing apparatus as recited in claim 1 wherein said machine base assembly is adapted for installation on machine table means between let-off means for feeding said plastic article and take-up means for gathering said plastic article subsequent to said processing thereof.

* * * * *